United States Patent

[11] 3,627,283

| [72] | Inventor | Neal A. Hittner<br>Garland, Tex. |
|---|---|---|
| [21] | Appl. No. | 887,284 |
| [22] | Filed | Dec. 22, 1969 |
| [45] | Patented | Dec. 14, 1971 |
| [73] | Assignee | Phillips Petroleum Company |

[54] DRIVE BELT AND RAILS TO MOVE ARTICLE THROUGH FLAME
5 Claims, 2 Drawing Figs.

| [52] | U.S. Cl. | 263/8, 263/4, 263/21 |
|---|---|---|
| [51] | Int. Cl. | F27b 9/24 |
| [50] | Field of Search | 263/4, 5, 8, 21 B |

[56] References Cited
UNITED STATES PATENTS

| 2,388,762 | 11/1945 | Powers | 263/8 |
|---|---|---|---|
| 2,963,389 | 12/1960 | Winkler | 263/5 X |
| 3,473,196 | 10/1969 | Hull et al. | 263/6 |

*Primary Examiner*—John J. Camby
*Attorney*—Young and Quigg

ABSTRACT: A flame-treating apparatus for generally cylindrical articles such as bottles comprises a belt means spaced apart from a pair of rails. The article is rolled between the belt and the rails to thus pass same through a flame so as to effect a surface treatment of the article.

PATENTED DEC 14 1971

3,627,283

INVENTOR.
N. A. HITTNER

BY

*Young & Quigg*

ATTORNEYS

3,627,283

DRIVE BELT AND RAILS TO MOVE ARTICLE THROUGH FLAME

BACKGROUND OF THE INVENTION

This invention relates to apparatus for flame-treating plastic articles.

It is well known to flame treat plastic articles in order to provide a surface which is more receptive to inks, paints, adhesives, and the like. While the principle of altering the surface characteristics of a plastic item by flame treatment has long been known, applying this principle successfully on a commercial scale is quite another matter. It is readily apparent that there is very little leeway in the amount and duration of contact with the flame since an insufficient contact cannot bring about the desired changes in the surface characteristics while too great a contact will melt the surface. These difficulties can be overcome in treating continuous lengths of flat material such as film and sheet, simply by passing the film or sheet past a flame at a high rate of speed. The difficulties encountered are magnified considerably, however, when dealing with shaped articles such as bottles. Here there is introduced the additional factor that too long a contact will cause distortion of the shape of the article.

The importance of uniform treatment without distorting the article is especially important with regard to bottles which are to be later handled in an ordinary commercial scale assembly line for labeling and/or filling. If there is any distortion of the bottle or if the treatment is incomplete, some of the distorted bottles or loose labels will foul up the line.

SUMMARY OF THE INVENTION

It is an object of this invention to provide uniform surface treatment of generally cylindrical plastic articles;

It is a further object of this invention to provide apparatus for flame-treating plastic articles which allows adequate treatment of the surface without distortion of the article; and It is yet a further object of this invention to provide an apparatus adapted to high-speed flame treatment of generally round plastic articles.

In accordance with this invention, generally round plastic articles are rolled between a pair of rails and a belt so as to pass same through a flame to treat the surface of said article.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
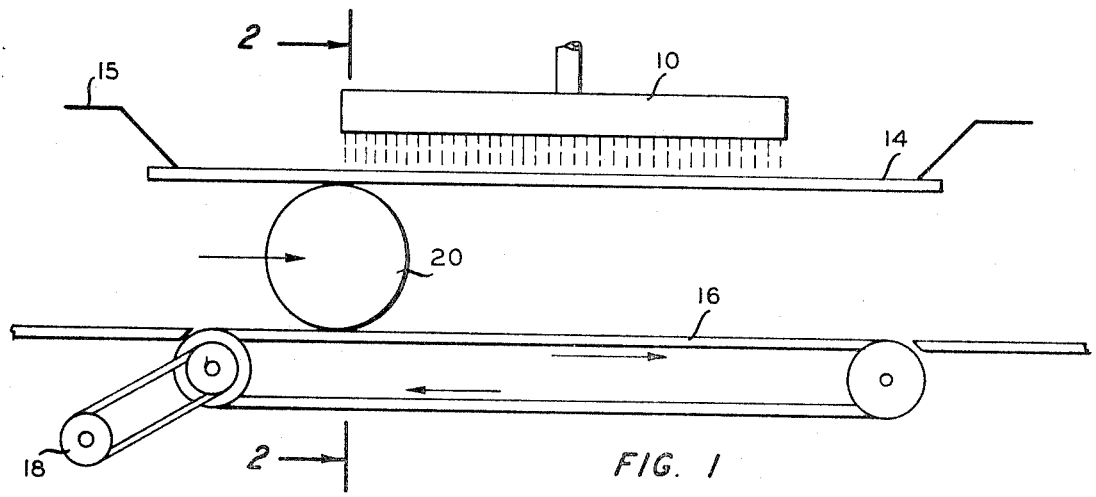
FIG. 1 is a schematic representation of the apparatus of the instant invention.

The instant invention is applicable to the surface treatment of any generally round plastic article. Its primary utility will be found in flame treating hollow containers such as bottles and the like.

The articles can be made of any plastic material. The materials for which flame treating is traditionally associated are primarily polymers of at least one mono-1-olefin having two to eight carbon atoms per molecule, particularly polymers and copolymers of ethylene, propylene, and 1-butene.

The belt can be either a single belt, which has a width substantially equal to the length of the article, or it can be a plurality of belts. Two belts can be used, one at each end of the article in which case the area between the belts can have a slightly greater deviation from a perfectly round configuration, although any deeply recessed area would fail to receive adequate surface treatment, because it would be further from the flame. For this reason, it is preferred to operate utilizing articles which are substantially cylindrical in the area to be treated. The belt can be made of any suitable material, such as rubber, fabric, and the like.

The rails serve the dual function of supporting the article as it is rolled along by the belt means and, preferably, also serve to cool the portion of the article adjacent the area being treated. In this way, the heat is primarily concentrated in the area to be treated. This aids greatly in minimizing distortion which would otherwise occur if the shoulder and bottom areas of the bottle were heated unduly. Thus, the rails are preferably made of metal, more preferably, they are made of hollow metal having a flat surface opposing the belt means so that water or other cooling fluid can be circulated therethrough. The position of the surface of the rails opposing the belt means determines the distance the article will be held away from the burner. Accordingly, the apparatus is preferably arranged so that this distance can be adjusted to fit the individual requirements of the articles being treated.

The burner preferably has a generally rectangular configuration with the width of the burner being equal to the height of the area of the article to be treated. The length of the burner is preferably exactly equal to the circumference of the bottle or other article being treated so that as the bottle rolls under the burner, the entire circumference will be treated exactly once with no gap and no overlapping of the treatment. Thus, the length of the burner should be equal to pi times the distance between the facing surfaces of the belt means and rails.

The speed with which the bottles are rolled past the burner can vary greatly, depending on the intensity of the flame, the distance between the surface being treated and the face of the burner, and the characteristics of the particular polymer. The essential feature of the invention is that the distance and speed can be exactly controlled so that once the proper speed and distance between the article and the burner have been determined, articles can be run through the apparatus on an assembly line basis with the assurance that each one will be uniformly treated. Generally, the burner will be disposed so as to leave a gap of ¼ to 4 inches between the face thereof and the surface to be treated which, assuming a cylindrical article, means that the distance between the face of the burner and the face of the rails opposing the belt means will be spaced apart a distance of ¼ to 4 inches.

Depending on the height of the flame, a lap of ¼ to 2 inches is generally achieved; belt speeds can thus vary widely with speeds of 1 to 20 feet per second being acceptable, although as noted hereinabove, these can vary widely.

Preferably, the apparatus is disposed in a horizontal plane as shown in the drawings with the burner positioned above the belt. The apparatus could be disposed at an angle or even upside down to that shown in the drawings, if desired.

Referring now to the drawings, there is shown a horizontally disposed burner means 10. Disposed to the side of and below burner means 10 are rails 12 and 14. Spaced apart from rails 12 and 14 is continuous belt 16 which is driven by motor 18. The article to be treated, in this case, bottle 20, is introduced at the left-hand side of belt 16. The space between the rails and the belt is equal to the diameter of bottle 20. Thus, as the belt moves in the direction shown by the arrows, it is rolled along the lower surfaces of rails 12 and 14.

Figure 2:
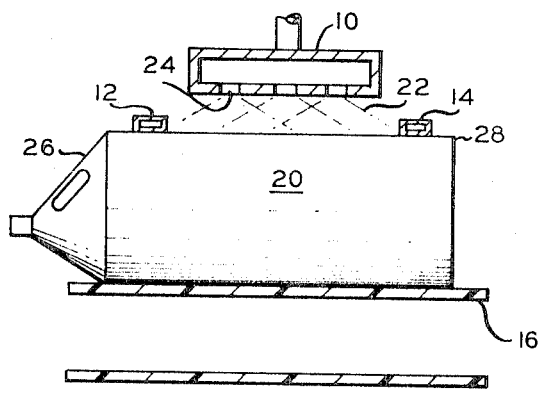
FIG. 2 is a cross section through lines 2-2 of FIG. 1.

Referring now specifically to FIG. 2, it can be seen that flame 22 issuing from orifices 24 in burner 10 impinges upon the surface of bottle 20 in the space between rails 12 and 14. The width of burner 10 is preferably equal to the height of the area on bottle 20 which it is desired to treat. The length of burner 10 is equal to the circumference of bottle 20 so that as the bottle rolls from one end to the other, the entire surface around the bottle is treated exactly one time. Water circulates through hollow rails 12 and 14 by means of water channels 15 so as to cool rails 12 and 14. In this way, the heat is not transferred toward the ends of the bottles sufficiently to cause distortion in the shoulder area 26 or the bottom area 28.

Many conventional parts such as conduits, valves, frame members and the like have been omitted from the drawings for the sake of simplicity, but their inclusion is understood by those skilled in the art and is within the scope of the invention.

ILLUSTRATIVE EMBODIMENT

One gallon bottles 6 inches in diameter are blow molded from 0.960 density (ASTM D 1505-63T), 0.9 melt index (ASTM D 1238-62T, Condition E) ethylene homopolymer, and are passed under and 3 inches from a rectangular gas burner which impinges a flame thereon by means of a belt which rolls the bottles along a pair of rail members as shown in the FIGS. The speed of the belts is adjusted to a linear velocity of 1.5 ft./sec. and the successive bottles introduced at a rate such that 180 bottles per minute are treated. The burner has a width of 5 inches and a length equal to the circumference of the bottles (18.9 inches). The resulting bottles are introduced into a labeling line and are processed without any difficulty due to distortion or poor adhesion of the labels.

While this invention has been described in detail for the purpose of illustration, it is not to be construed as limited thereby but is intended to cover all changes and modifications within the spirit and scope thereof.

I claim:

1. An apparatus for moving a generally round plastic article through a flame-treating zone comprising in combination:
    a rectangular burner;
    a belt means, said belt means being spaced apart from said burner and disposed parallel to the longitudinal direction of said burner;
    a pair of rails, said rails being disposed between said burner and said belt means a short distance from said burner and parallel to the longitudinal direction of said burner; and
    means to drive said belt means so said article can be rolled between said belt means and said rails past said burner.

2. Apparatus according to claim 1 wherein said burner has a length equal to pi times the distance between opposing surfaces of said rails and said belt means.

3. Apparatus according to claim 1 wherein said apparatus is disposed in a horizontal plane with said burner above said rails.

4. Apparatus according to claim 1 comprising in addition means to introduce a cooling medium into said rails.

5. Apparatus according to claim 3 wherein said rail is ¼ to 4 inches below the lower surface of said burner.

* * * * *